United States Patent [19]

Hocking et al.

[11] Patent Number: 5,382,456
[45] Date of Patent: Jan. 17, 1995

[54] PRODUCTION OF CERAMIC FILAMENTS

[75] Inventors: Michael G. Hocking; Paulette S. Sidky, both of Guildford, United Kingdom

[73] Assignee: The Secretary of State for Defence in Her Britannic Majesty's Government of the United Kingdom and Northern Ireland, United Kingdom

[21] Appl. No.: 971,825

[22] PCT Filed: Jul. 18, 1991

[86] PCT No.: PCT/GB91/01202

§ 371 Date: Feb. 17, 1993

§ 102(e) Date: Feb. 17, 1993

[87] PCT Pub. No.: WO92/01649

PCT Pub. Date: Feb. 6, 1992

[30] Foreign Application Priority Data

Jul. 19, 1990 [GB] United Kingdom ............... 9015872

[51] Int. Cl.⁶ ........................................ B05D 1/18
[52] U.S. Cl. ............................ 427/434.6; 427/399; 427/434.2; 427/598; 118/DIG. 5; 118/DIG. 19; 118/402; 118/405; 118/423
[58] Field of Search ............ 427/399, 434.5, 434.6, 427/598, 185; 118/DIG. 5, DIG. 19, 402, 405, 423

[56] References Cited

U.S. PATENT DOCUMENTS

| | | | |
|---|---|---|---|
| 4,122,212 | 10/1978 | Walling et al. | 427/185 |
| 4,325,930 | 4/1982 | Vallet | 423/345 |
| 4,473,105 | 9/1984 | Pryor | 164/467 |
| 4,565,571 | 1/1986 | Abbcschian | 164/467 |
| 4,762,553 | 8/1988 | Savage et al. | 264/10 |
| 5,171,734 | 12/1992 | Sanjurjo et al. | 427/185 |

FOREIGN PATENT DOCUMENTS 0032097 6/1981 European Pat. Off. .

OTHER PUBLICATIONS

Chemical Abstracts, vol. 77, No. 14, Oct. 2, 1972; Abstract no. 91928N, A. A. Fogel et al; Parameters of a Molten Metal Held In et al.

Chemical Abstracts, vol. 104, No. 20, May 19, 1986; Abstract no. 173252C, H. Izawa 'Surface Treatment of Carbon Products' p. 296; column 2.

*Primary Examiner*—Shrive Beck
*Assistant Examiner*—Brian Talbot
*Attorney, Agent, or Firm*—Nixon & Vanderhye

[57] ABSTRACT

Apparatus for producing refractory material filaments comprises an enclosure (11), means for heating the constituents of the refractory material, non-contacting means to support a drop (17) of molten material such as silicon, being one of the constituents of the refractory material within the enclosure and means to transport a filament (10) such as carbon, being a second constituent of the refractory material, through the drop of molten material in use. A levitation coil and/or an inert gas jet is used to support the drop of molten material and a silica glass or other refractory tube (13) is used to direct the gas jet. The enclosure has opposed side arms (15, 16) respectively for entry and exit of the filament (10) or the filament may be passed vertically through the molten silicon drop. An inclined side tube may be provided through which grains of silicon may be introduced into the enclosure for addition to the molten drop. In one form, initial heating of the silicon prior to levitation is achieved by providing a resistively heated silicon nitride platform on which the silicon is melted, the platform then being moved from the field of the levitation coil to leave a levitated silicon drop.

15 Claims, 1 Drawing Sheet

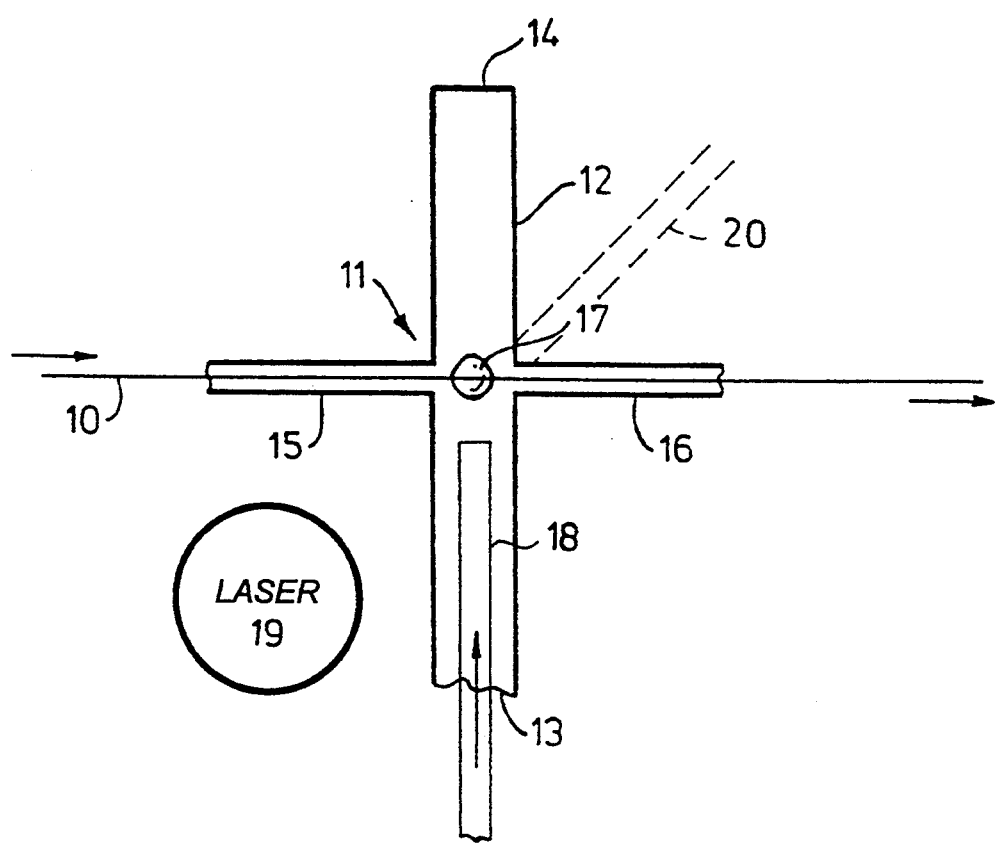

PRODUCTION OF CERAMIC FILAMENTS

BACKGROUND OF THE INVENTION

The invention relates to refractory fibers and in particular but not exclusively to the production of silicon carbide and silicon carbide coated carbon fibers.

DISCUSSION OF PRIOR ART

GB Patent No 2,227,483 describes a method of manufacture of refractory fibers of silicon carbide or silicon carbide coated carbon by passing fine carbon fibers through molten silicon. Molten silicon is contained within a crucible provided with one or more holes in its base through which fiber(s) can be drawn. The holes are dimensioned such that surface tension forces in the molten silicon prevent silicon from flowing out of the crucible.

The object of the present invention is to provide apparatus and method for manufacture of refractory filaments, particularly silicon carbide, utilizing molten material such as silicon without problems associated with crucible containment.

The invention provides in one form apparatus for producing refractory material filaments comprising: an enclosure; means for heating the constituents of the refractory material; non-contacting means to support a drop, of molten material, being one of the constituents of the refractory material, within the enclosure; and means to transport a filament made of material, being a second constituent of the refractory material, through the drop of molten material in use.

In one arrangement the apparatus may be used with a carbon filament: and molten silicon.

The means to support or levitate the silicon drop may be a levitation coil and/or a gas jet. A silica glass or other refractory tube may be provided to direct the gas jet and the gas may be selected to provide an inert, protective atmosphere to prevent oxidation.

Advantageously the enclosure includes opposed side arms which are respectively for entry and exit of the filament. Alternatively the filament may be passed vertically through the molten silicon drop. An inclined side tube may be provided through which grains of silicon may be introduced into the enclosure for addition to the molten drop.

In one form, initial heating of the silicon prior to levitation may be achieved by providing a resistively heated silicon nitride platform on which the silicon can be melted, the platform being removable from the field of the levitation coil so as to leave a levitated silicon drop. Alternatively a laser may be provided to melt the silicon.

The invention also provides in a second form a method of making silicon carbide filaments comprising the steps of:

a) forming a molten drop of silicon;
b) levitating the molten drop; and
c) passing a carbon filament through the molten drop.

The molten drop may be formed by:

a) placing silicon on a platform;
b) heating the platform; then
c) removing the platform.

In one form the platform is made of silicon nitride such that it is not wetted by molten silicon. The silicon can then be melted by resistively heating the platform or heating by means of a laser.

Once the silicon is melted the means to levitate the molten silicon may be applied and the platform removed to leave the levitated drop of silicon.

The levitation may be achieved by application of an electromagnetic field from a levitation coil or by forming an upward jet of supporting gas.

Preferably the gas is selected such that oxidation of the molten silicon does not occur.

The carbon filament may conveniently be passed horizontally through the molten drop.

Preferably the molten drop of silicon is replenished by addition of solid silicon to the molten drop to thereby enable continuous manufacture of silicon carbide filaments.

DETAILED DESCRIPTION OF PREFERRED EMBODIMENTS

The invention will now be described with reference to the accompanying Figure which shows a carbon filament 10 being fed into a reaction enclosure 11. The reaction enclosure 11 is formed by a vertical silica tube 12, open at its lower end 13 and closed at its upper end 14. Two opposed lateral side tubes 15, 16 are provided through which the carbon filament 10 is fed from a take-off spool (not shown) to a take-up spool (not shown). As shown, a spherical drop 17 of molten silicon is levitated by means of an external levitation coil (not shown for clarity) such that the carbon fiber 10 passes through the molten silicon. An inert gas is introduced into the silica tube 13 to prevent oxidation of the heated silica such that the gas enters the open end 13 of the tube and flows out through the side tubes 15 and 16.

Silicon will not normally levitate when cold because of its low room temperature electrical conductivity. To overcome this problem a silicon nitride platform 18 can be provided to support solid silicon within the levitation coil and within the heated region in the silica tube 12. The silicon nitride and the silicon are platform then heated resistively or alternatively the silicon is heated directly by laser 19 and once the silicon is red hot, the platform is slowly moved downwards through the tube 12 while the levitation coil is energized. Silicon nitride is a particularly suitable material for the platform as it is not wetted by the silicon.

In use one or more carbon filaments are drawn through the molten silicon, the filament diameter and drawing speed determining whether: the carbon is coated with silicon; the carbon surface is converted to silicon carbide; or the carbon is completely converted to silicon carbide.

The upward flow of gas through the reaction enclosure 11 assists in supporting the molten silicon drop 17 and it may be possible to dispense with the levitation coil and make use of the gas lift alone. In an alternative arrangement the side tubes 15 and 16 may be dispensed with and the filament may be drawn upwardly through the molten silicon drop and through a suitable orifice at the top of the silica tube 12.

Although described in relation to silicon carbide filament manufacture the invention may be applied to any filamentary material which is to be coated or reacted with a further material which is capable of being levitated within a reaction enclosure.

A further sloping side tube 20 (as shown in dashed lines) may be provided in the wall of the silica tube such that grains of silicon can be introduced therethrough so as to fall into the molten silicon drop to replenish lost silicon.

We claim:

1. Apparatus for producing refractory material filaments (10) comprising:
   an enclosure (11);
   means for heating constituents of the refractory material;
   non-contacting means for supporting a drop (17) of molten material, comprising a first constituent of the refractory material, within the enclosure, said non-contacting means comprises electromagnetic levitation; and
   means for transporting a filament comprising a second constituent of the refractory material, through the drop of molten material.

2. Apparatus for producing refractory material filaments as claimed in claim 1 wherein the filament (10) is carbon and the molten material (17) is silicon.

3. Apparatus for producing refractory material filaments as claimed in claim 1 wherein a silica glass tube (13) comprises a means for providing an inert gas in said enclosure.

4. Apparatus for producing refractory material filaments as claimed in claim 1 wherein the enclosure includes opposed side arms (15,16) which are respectively for entry and exit of the filament (10).

5. Apparatus for producing refractory material filaments as claimed in claim 1 wherein the filament (10) is passed vertically through the molten drop (17).

6. Apparatus for producing refractory material filaments as claimed in claim 1 further including an inclined side tube comprising a means for introducing grains of silicon into the enclosure for addition to the molten drop (17).

7. Apparatus for producing refractory material filaments as claimed in claim 2 further including a resistively heated silicon nitride platform on which the silicon can be melted prior to levitation, the platform being located in a position in the field of a levitation coil and removable therefrom so as to leave a levitated silicon drop (17).

8. Apparatus for producing refractory material filaments as claimed in claim 1 further including for melting the silicon.

9. A method of making silicon carbide filaments by passing a carbon filament through molten silicon, said method comprising the steps of:
   a) forming a molten drop (17) of silicon;
   b) levitating the molten drop; and
   c) passing a carbon filament (10) through the molten drop (17) so as to form said silicon carbide filament.

10. A method of making silicon carbide filaments as claimed in claim 9 wherein the molten drop (17) is formed by the steps of:
    a) placing silicon on a platform;
    b) heating the platform until said silicon is molten; then
    c) removing the platform.

11. A method of making silicon carbide filaments as claimed in claim 10 wherein said levitating the molten drop (17) comprises the step of application of an electromagnetic field from a levitation coil.

12. A method of making silicon carbide filaments as claimed in claim 10 further including, after the drop forming step and before the filament passing step, the step of flowing an inert gas around said drop such that oxidation of the molten silicon does not occur.

13. A method of making silicon carbide filaments as claimed in claim 10 wherein the carbon filament (10) is passed horizontally through the molten drop (17).

14. A method of making silicon carbide filaments as claimed in claim 10 further including the step of replenishing the molten drop (17) of silicon by addition of solid silicon to the molten drop to thereby enable continuous manufacture of silicon carbide filaments.

15. A method of making silicon carbide filaments as claimed in claim 12 further including, after the drop forming step and before the filament passing step, the step of flowing an inert gas around said drop such that oxidation of the molten silicon (17) does not occur.

* * * * *